US006550416B2

(12) United States Patent
Newman

(10) Patent No.: US 6,550,416 B2
(45) Date of Patent: Apr. 22, 2003

(54) PNEUMATIC VALVE DEVICE

(76) Inventor: Duncan Newman, 61 Research Road, Toronto Ontario (CA), M4G 2G8

( * ) Notice: Subject to any disclaimer, the term of this patent is extended or adjusted under 35 U.S.C. 154(b) by 0 days.

(21) Appl. No.: 09/729,711

(22) Filed: Dec. 6, 2000

(65) Prior Publication Data

US 2001/0000385 A1 Apr. 26, 2001

Related U.S. Application Data

(63) Continuation-in-part of application No. 09/058,197, filed on Apr. 10, 1998, now abandoned.

(51) Int. Cl.[7] ........................ B65D 51/16; F16K 31/44; G10K 9/18

(52) U.S. Cl. ................................ 116/142 FP; 116/139; 137/233; 137/625.25; 220/915; 215/315

(58) Field of Search .......................... 116/142 FP, 139, 116/137 R, DIG. 7, DIG. 18, DIG. 19; 137/232, 233, 223, 625.25; 220/724, 728, 915; 215/19, 315; 222/3, 527

(56) References Cited

U.S. PATENT DOCUMENTS

| | | | | | |
|---|---|---|---|---|---|
| 1,434,656 | A | * | 11/1922 | Garratt | 116/142 FV |
| 1,482,237 | A | * | 1/1924 | Lent | 137/227 |
| 1,701,311 | A | * | 2/1929 | Scott et al. | 116/34 R |
| 3,559,701 | A | * | 2/1971 | Wittersheim et al. | 141/20 |
| 4,195,756 | A | * | 4/1980 | Campbell | 222/182 |
| 4,227,482 | A | * | 10/1980 | Scheindel | 116/142 FP |
| 4,252,077 | A | * | 2/1981 | Frigo | 116/142 FP |
| 4,283,013 | A | * | 8/1981 | Leveque et al. | 239/304 |
| 4,481,970 | A | * | 11/1984 | Reid | 137/223 |
| 4,694,975 | A | * | 9/1987 | Hagan | 222/1 |
| 4,756,347 | A | * | 7/1988 | Hagan et al. | 141/21 |
| 4,773,571 | A | * | 9/1988 | Hagan et al. | 222/394 |
| 4,915,054 | A | * | 4/1990 | Vidovic et al. | 116/142 FP |
| 5,020,467 | A | * | 6/1991 | Van Patten et al. | 116/210 |
| 5,110,014 | A | * | 5/1992 | Doundoulakis | 222/396 |
| 5,314,097 | A | * | 5/1994 | Smrt et al. | 222/402.1 |
| 5,355,830 | A | * | 10/1994 | deJong | 116/142 FP |
| 5,558,117 | A | * | 9/1996 | McGuinness | 137/223 |
| 5,782,198 | A | * | 7/1998 | Sinclair et al. | 116/139 |
| 5,819,779 | A | * | 10/1998 | Takemura et al. | 137/229 |
| 5,918,779 | A | * | 7/1999 | Ventura | 222/402.1 |

* cited by examiner

*Primary Examiner*—Diego Gutierrez
*Assistant Examiner*—R. Alexander Smith
(74) *Attorney, Agent, or Firm*—Dowell & Dowell, P.C.

(57) ABSTRACT

This invention relates to a pneumatic valve device, such as a pneumatic horn and a pneumatic sprayer, which is operable by pressurized gas from a storage vessel. It comprises a valve pneumatically connectable to the storage vessel to admit and release pressurized gas into and from the storage vessel; a connecting chamber for pneumatically connecting the valve to the pneumatically operable device to conduct pressurized gas released through the valve to the pneumatically operable device; and a manually operable control operable to release pressurized gas from the valve into the connecting chamber.

13 Claims, 6 Drawing Sheets

FIG. 7
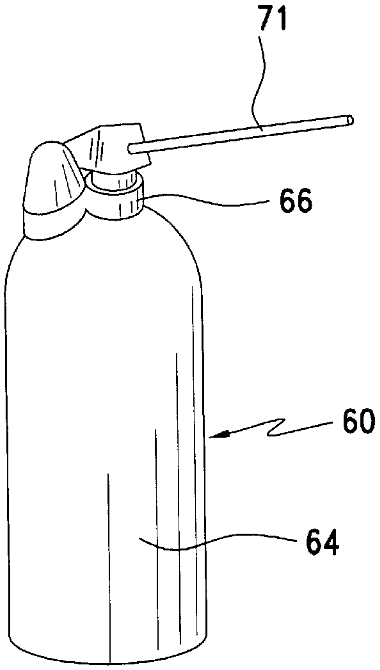
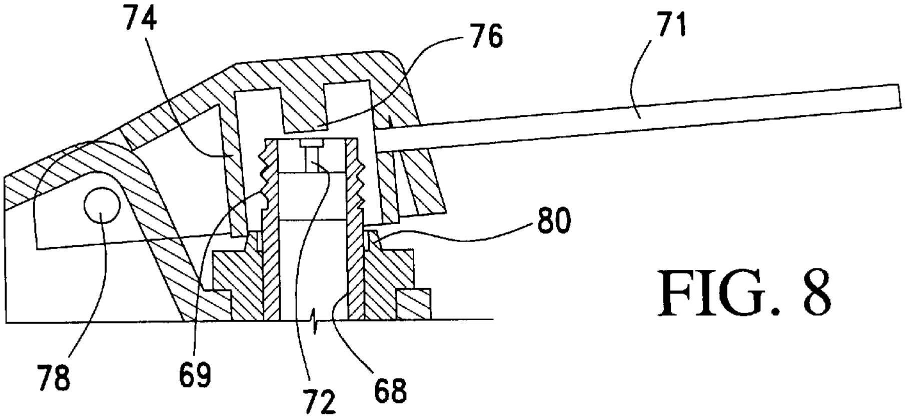
FIG. 8
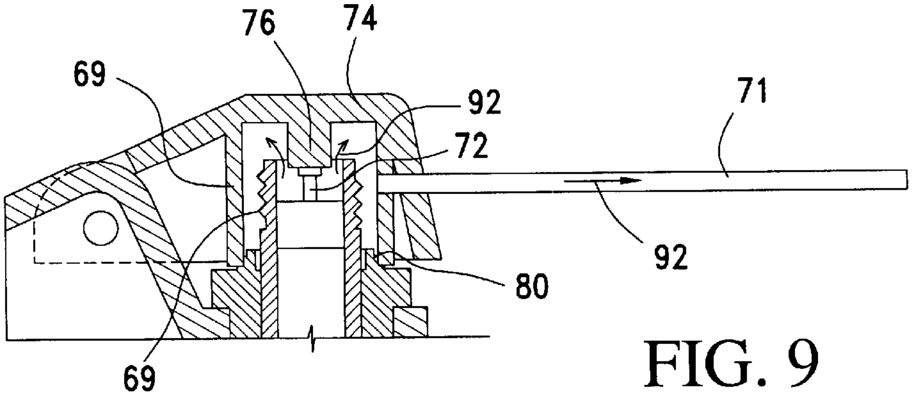
FIG. 9

PNEUMATIC VALVE DEVICE

The present invention relates to a device having a singular valve that can be attached to a storage vessel to deliver pressurized air to the storage vessel and which can also release pressurized air through its same singular valve into a directing chamber for use in pneumatically operable devices, such as an aerosol spray nozzle or a bicycle horn. This application is a continuation in part of U.S. application Ser. No. 09/058,197, filed Apr. 10, 1998 now abandoned.

BACKGROUND OF THE INVENTION

Pneumatic devices which use pressurized gas for applications such as horns or aerosol cans have been around for quite some time.

In the case of bicycle horns, these horns generally have included a hollow rubber bulb attached to the born which is squeezed by the user to create and force pressurized air through the horn. The sound coming from this type of horn is not satisfactorily loud. Alternatives have been proposed to increase the loudness of the sound of horns but those alternatives are expensive with very sophisticated design. For instance, there have been horns with pre-pressurized pneumatic chambers so that, upon the release of an outlet valve pressure is released into the horn chamber to cause the horn membrane to vibrate. The resulting sound is quite loud. But the design requires two valves, one being an inlet vale for pressurizing the camber with gas and the other being an outlet valve for releasing pressurized gas into the horn chamber these assemblies are for that reason relatively expensive and unsatisfactory for as broad an application as the present invention.

In the case of aerosol cans, there have been refillable aerosol cans available where the user can, through a valve, pump air into the can and re-pressurize it. However, these cans are generally expensive to manufacture because the addition of the valve, further to the spray nozzle, adds extra cost to production. A simpler device is required.

It is an object of the present invention to provide a device for use with a storage vessel to deliver pressurized air to the storage vessel and which can also release pressurized air through its same singular valve into a directing chamber for use in other applications, such as an aerosol can or a bicycle horn.

It is a further object of the present invention to provide a device for use with a pneumatic horn and a storage vessel for pressurized gas at a pressure to operate the horn which is inexpensive and simple in design.

It is a further object of the present invention to provide a device for use with a aerosol spray nozzle and a storage vessel for pressurized gas at a pressure to operate the nozzle which is inexpensive and simple in design.

It is a further object of the present invention to provide a device for use with a pneumatic horn and a storage vessel for pressurized gas at a pressure to operate the horn which creates a very loud sound.

It is a further object of the present invention to provide a device for use with a pneumatic horn and a storage vessel for pressurized gas at a pressure to operate the horn which uses a single valve of simple design to both admit and release gas into and from the storage vessel.

It is a further object of the present invention to provide a device for use with a aerosol spray nozzle and a storage vessel for pressurized gas at a pressure to operate the horn which uses a single valve of simple design to both admit and release gas into and from the storage vessel.

SUMMARY OF THE INVENTION

According to one aspect of the present invention, there is provided a device with a singular valve for delivering pressurized gas into a storage vessel to which it can be attached and releasing pressurized gas from the storage vessel into a directing chamber which in turn can be attached to another device, such as a pneumatic horn or aerosol nozzle, for operation.

DESCRIPTION OF THE DRAWINGS

The invention will be more readily understood after reading the following description of the preferred embodiment in conjunction with the drawings of the preferred embodiments in which:

FIG. 7 is a perspective view of an aerosol can incorporating this invention.

FIGS. 8 and 9 are partial cross section views of the manually operable control means to release gas through the valve and the connecting means for pneumatically connecting the valve to the spray nozzle;

DETAILED DESCRIPTION OF THE PREFERRED EMBODIMENT

Figure 1:
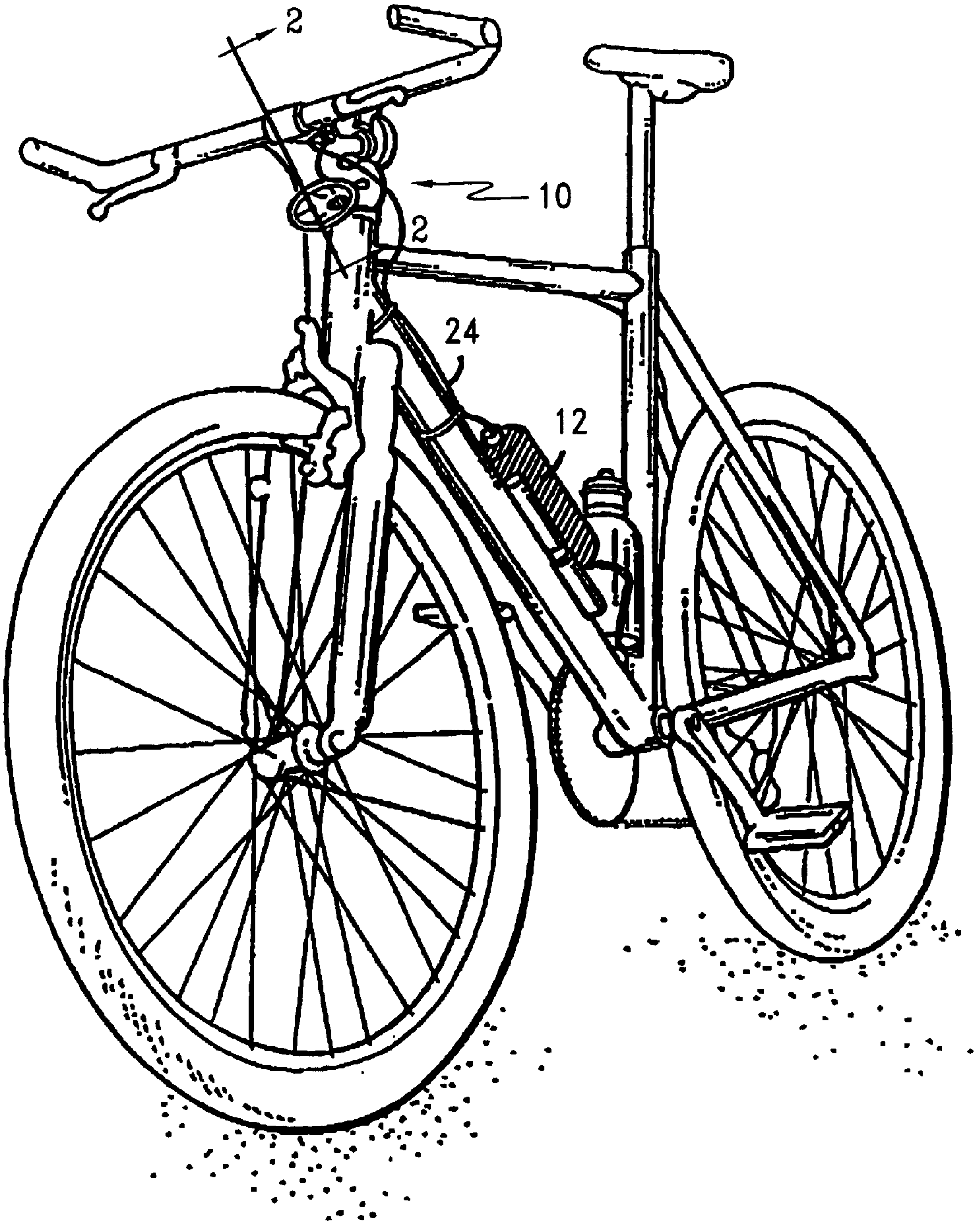
FIG. 1 is a view of a bicycle with a horn, operated by the invention, mounted on it.

Describing the embodiment in FIGS. 1 to 6:

FIG. 1 illustrates a horn assembly incorporating the present invention and mounted on a bicycle. It is similar to other horns according to this invention mounted on a bicycle. It is similar to other horns of the same type in that it has a pneumatic horn, generally referred to by the numeral 10, of standard design that is supplied with air under pressure from a storage vessel 12 upon operation of a manual control device, but it differs materially from its predecessors in the design of the valving for charging the storage vessel with pressurized air and releasing the pressurized air to sound the horn. As will be explained, this invention uses a single valve of simple design to both admit and release air into and from the storage vessel.

Figure 2:
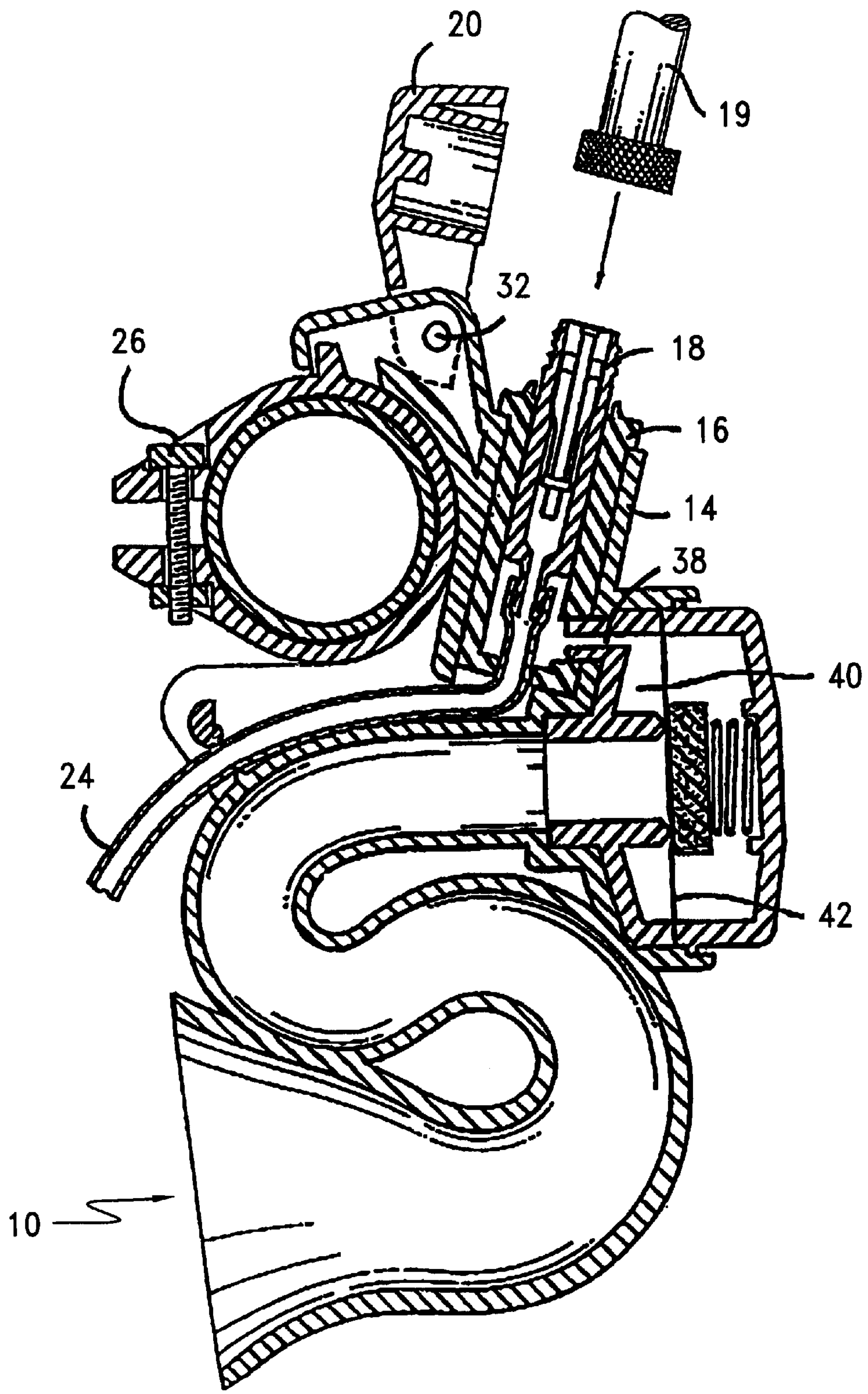
FIG. 2 is a cross sectional view of the horn taken along 2—2, with the cupped member raised to permit filling of the storage vessel with air.

FIG. 2 is a sectional illustration of the assembly exclusive of the storage vessel taken along line 2—2 of FIG. 1. The horn, generally referred to by the numeral 10, has a sleeve 14 that seats a valve mounting chamber 16. Valve 18 is press-fitted into the valve mounting chamber 16 with one end of its tubular body exposed to the atmosphere for access by a tube 19 from a standard bicycle pump and by a cupped member 20 to be referred to later.

The valve 18 is a standard bicycle valve of the type that has been in general use for generations. It is commonly referred to as a Dill (trade mark) valve and is presently manufactured by Eaton Yale Corporation (trade name). It has a tubular body and a stem 22 that is normally spring-urged to a closed position. The stem 22 can be manually depressed to overcome the bias and open the valve.

The other end of the tubular valve body is formed to fit into the end of the tube 24 that extends to the storage vessel 12

The horn is clamped to the handle bars of a bicycle in use as indicated at numeral 26.

In use, as will be explained more fully later, air is released from the storage vessel 12 by manually controlling the opening of valve 18 and conducting the released air to the horn to operate it. These things are achieved in the embodiment of the invention by the cupped member 28 and the finger 30 on its bottom.

Figure 3:
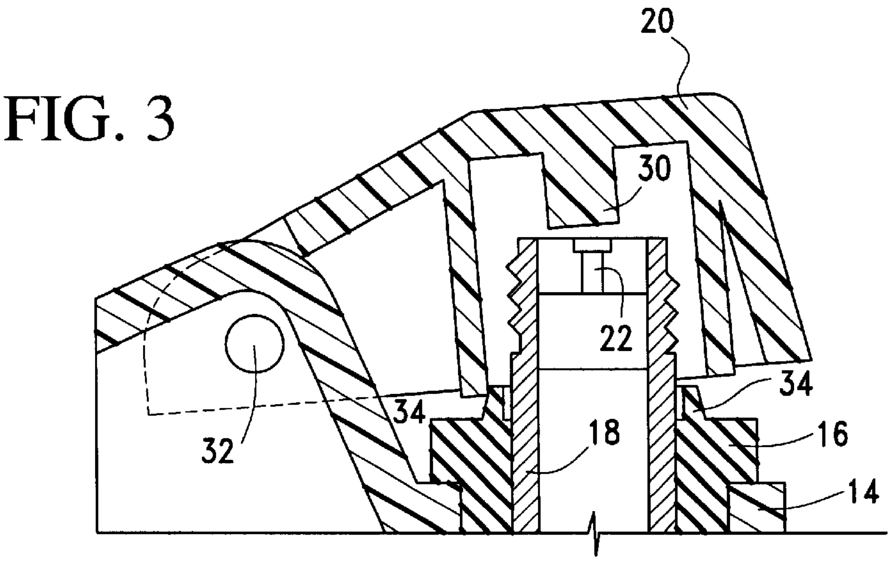
FIGS. 3 and 4 are partial cross sectional views of the manually operable control means to release gas through the valve and the connecting means for pneumatically connecting the valve to a pneumatic horn.
Figure 4:
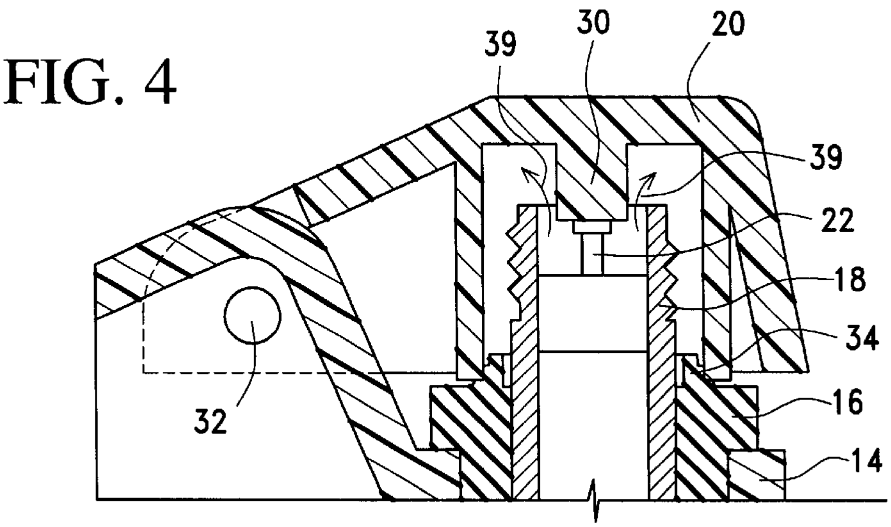

Cupped member 20 is hinged on the horn frame as at 32 and can be swung from an inoperative position as illustrated in FIG. 3 to an operative position as illustrated in FIG. 4. In the inoperative position, the stem 22 of the valve 18 is spring biased to its normal closed position.

When it is manually swung to the operative position of FIG. 4, the edges of the cup engage the circumferentially extending sealing flange 34 to seal the open end of the valve from atmosphere. Sealing flange 34 and valve mounting chamber 16 is formed from an elastomeric material sufficiently resilient to form a good seal with cupped member 20 as cupped member 20 is pressed against it and to permit cupped member 20 to continue to be pressed downwardly to pen the valve after the stem 30 of supped member 20 comes into contact the stem 22 of the valve. Also, the resilient nature of the elastomer permits the achieving of a proper seal at 41.

Although the sealing flange 34 and valve mounting chamber 16 are made from a suitable resilient elastomer material, and the nut and bolt arrangement sued to clamp the device to the handle bar of the bicycle is made of metal, the rest of the device is preferably made from a rigid plastics material such as a polyvinyl chloride.

Figure 5:
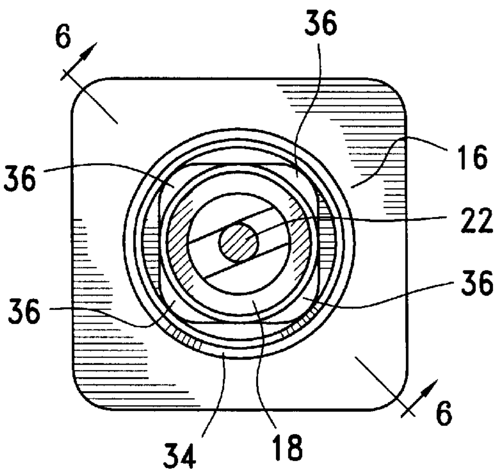
FIG. 5 is a top view, partly in section, illustrating the valve and valve mounting chamber of the embodiment of FIG. 1.
Figure 6:
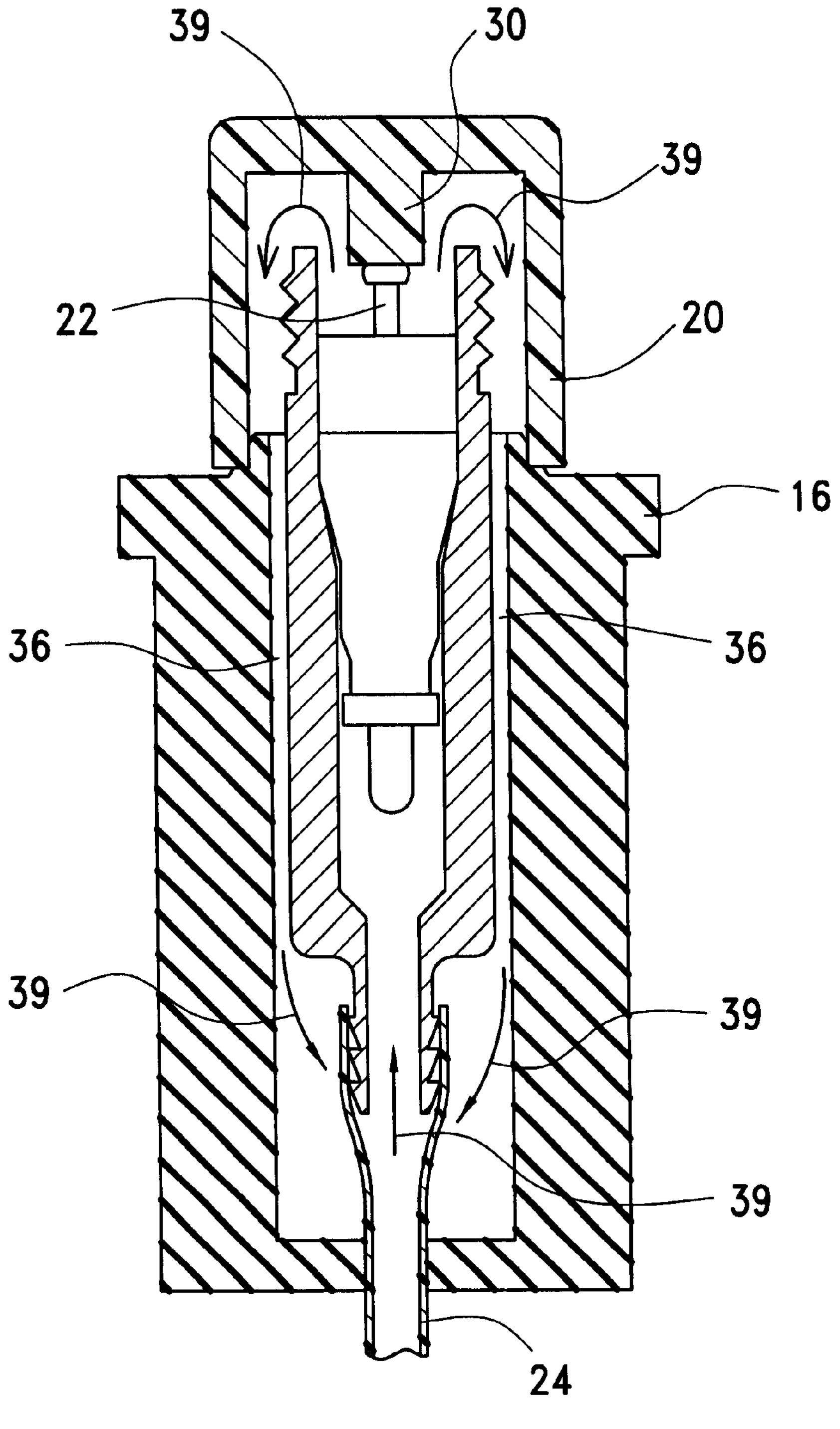
FIG. 6 is a sectional view on line 6—6 of FIG. 5 but also showing the cup member pressed onto the valve to open the valve and also illustrating the passages between the inlet tube, the valve and the horn chamber.

As is apparent from FIGS. 5 and 6, the inside of the valve mounting chamber is formed with grooves to provide air passages 36 between the body of the valve 18 and the mounting chamber 16 that extend the full length of their common extent. Thus, when the cupped member 20 is in the operative position of FIG. 4, the output of the valve is pneumatically connected to the pneumatic horn. It is forced through passages 36, through horn entrance port 38 into horn chamber 40. The horn chamber is pressurized to actuate the spring-loaded membrane 42 and sound the horn. The horn is of standard design and detailed reference is not made to it in this application As the manually controlled cup member 28 is moved to an operative position of FIG. 4, the finger 30 on the bottom thereof engages and depresses the valve stem 22 to open the valve and release pressurized air from the storage vessel through to the horn as described above.

In use, the assembly is mounted on a bicycle or the like and the storage vessel 12 is pressurized to about 100 psi from the deliver tube 19 of a standard bicycle pump the pump is disconnected from the valve the horn is now ready for use. When the cyclist wants to sound the horn, the cupped member 24 is swung from the inoperative position of FIG. 3 to the operative position of FIG. 4. This seals the interior of the valve mounting chamber 16 from the atmosphere and depresses the stem of the valve to open the valve. In this mode, pressurized air is free to flow from the storage vessel 12 through hose 24, through valve 18, through passages 36, through horn entrance port 38 and into the annular chamber 40 to vibrate the membrane 42 and sound the horn. The direction of air flow is indicated by arrows 39 in FIG. 6.

It will be noted that all valving is achieved with a unique operational sequence of a single valve of simple design. The assembly is rugged and reliable as well as simple and is, from an operational point of view, the full equal of much more expensive assemblies for the same purpose.

Referring to the embodiment in FIGS. 7 to 10,:

In FIGS. 7 to 10, there is illustrated an aerosol can, generally referred to by the numeral 60, incorporating this invention. It is similar to other aerosol cans in that is has a nozzle spray tube 71 of standard design that can be supplied with air under pressure from a storage vessel 64 upon operation of a manual control device, but it differs materially from its predecessors in the design of the valving for charging the storage vessel with pressurized air and releasing the pressurized air to utilize the nozzle. As will be explained, this invention uses a single valve of simple design to both admit and release air into and from the storage vessel.

Figure 10:
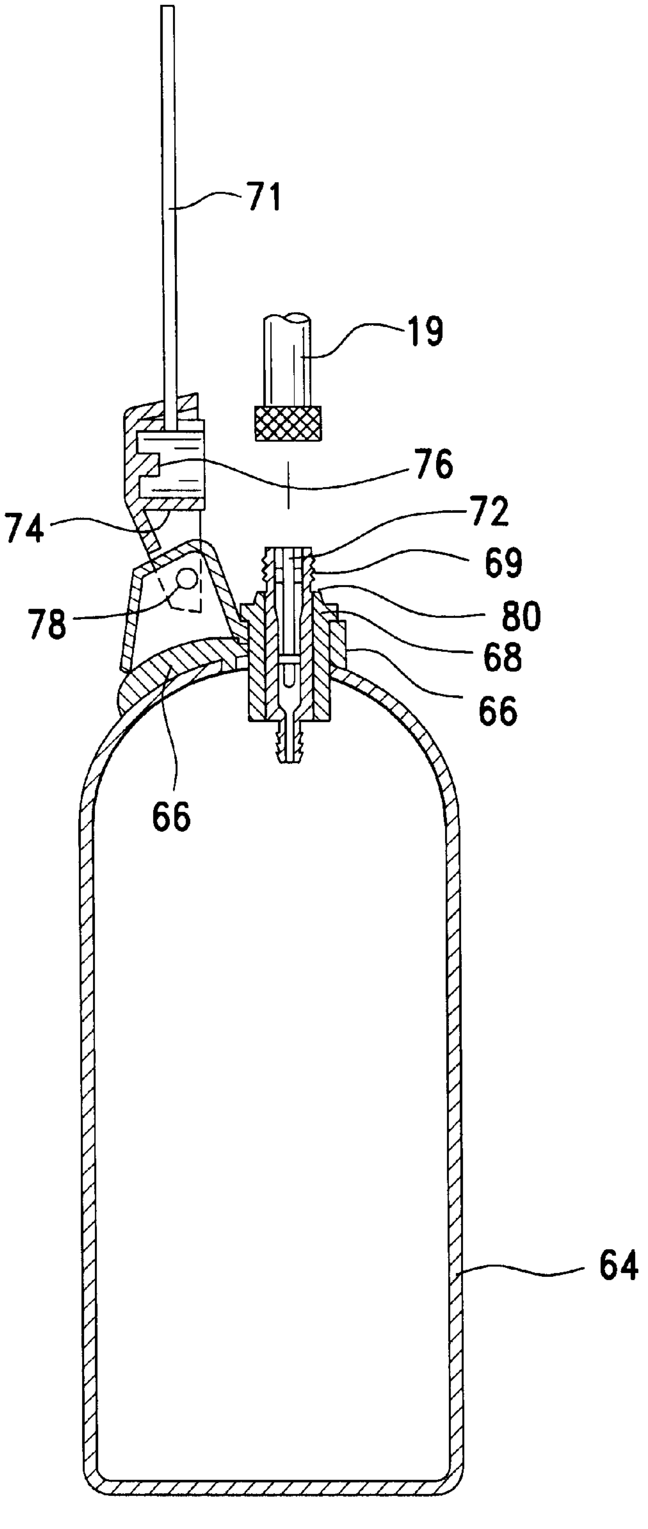
FIG. 10 is a cross-sectional view of the aerosol can of FIG. 7, with the cupped member raise to permit filing of the storage vessel with air.

FIGS. 8 and 9 are a sectional illustrations of the aerosol can assembly exclusive of the storage vessel showing the operation of the invention. There is provided an outer support member 66 that seats a valve mounting chamber 68. Valve 69 is press-fitted into the valve mounting chamber 68 with one end of its tubular body exposed to the atmosphere for access by a tube 19 (as shown in FIG. 10) from a standard bicycle pump and by a cupped member 70 to be referred to later.

As in the previously described embodiment, the valve 69 is a standard bicycle valve of the type that has been in general use for generations, commonly referred to as a Dill (trade mark) valve. It has a tubular body and a stem 72 that is normally spring-urged to a closed position. The stem 72 can be manually depressed to overcome the bias and open the valve.

The other end of the tubular valve body extends into the storage vessel 64.

In use, as will be explained more fully later, air is released from the storage vessel 64 by manually controlling the opening of valve 69 and conducting the released air into and through the nozzle to spray air out of the nozzle spray tube 71. These things are achieved in the embodiment of the invention by the cupped member 74 and the finger 76 on its bottom.

Cupped member 74 is hinged on the outer support member 66 as at 78 and can be swung from an inoperative position as illustrated in FIG. 8 to an operative position as illustrated in FIG. 9. In the inoperative position, the stem 72 of the valve 69 is spring biased to its normal closed position.

When it is manually swung to the operative position of FIG. 9, the edges of the cupped member 74 engage the circumferentially extending sealing flange 80 to seal the open end of the valve from atmosphere. Sealing flange 80 and valve mounting chamber 68 is formed from an elastomeric material sufficiently resilient to form a good seal with cupped member 74 as cupped member 74 is pressed against it and to permit cupped member 74 to continue to be pressed downwardly to open the valve after the stem 76 of cupped member 74 comes into contact the stem 76 of the valve. Also, the resilient nature of the elastomer permits the achieving of a proper seal.

Although the sealing flange 80 and valve mounting chamber 68 are made from a suitable resilient elastomer material, and the storage vessel is made of metal, the rest of the device is preferably made from a rigid plastics material such as a polyvinyl chloride.

As is apparent from FIGS. 8 and 9, when the cupped member 74 is in the operative position of FIG. 9, the output of the valve is pneumatically connected to the nozzle spray tube 71. It is forced through the inner chamber of the cupped member 74 and into and through the nozzle spray tube 71 to deliver pressurized air therefrom. The aerosol storage vessel and the nozzle spray tube 71 are of standard design and detailed.reference is not made to it in this application.

In use, the aerosol can 60 is pressurized to about 100 psi from the nozzle spray tube 71 of a standard bicycle pump. The pump is disconnected and the aerosol can is now ready for use.

When the user wants to sound the use the can for dusting or cleaning, the cupped member 70 is swung from the inoperative position of FIG. 8 to the operative position of FIG. 9. This seals the interior within the cupped member 74 from the atmosphere and depresses the stem of the valve to open the valve. In this mode, pressurized air is free to flow from the storage vessel 64 through valve 69, through the chamber formed by the depression of the cupped member 74, and through the nozzle spray tube 71. The direction of air flow is indicated by arrows 92 in FIG. 9.

As was the case with the bicycle horn, all valving is achieved with a unique operational sequence of a single valve of simple design. The assembly is rugged and reliable as well as simple. Instead of requiring an separate inlet to the outlet for pressurizing the chamber, only a single inlet-outlet is used.

It is not the intention that the invention be limited to the embodiments illustrated. The advantages come from the realization of the superiority of a device with a single valve with connecting means for pneumatically connecting it to a storage vessel and to another device which can utilize the pneumatic pressure and a manually operable control means for releasing pressurized gas through the valve. Valves and control means other than the one shown are contemplated as being within the spirit and scope of the invention.

The embodiments of the invention in which an exclusive property or privilege is claimed are defined as follows:

1. A pneumatic valve device for use with a pneumatically operable device and a storage vessel for pressurized gas at a pressure to operate the pneumatically operable device comprising:

a pneumatic valve pneumatically connectable to the storage vessel to admit and release pressurized gas into and from the storage vessel;

connecting means for pneumatically connecting said pneumatic valve to the pneumatically operable device to conduct pressurized gas released through said pneumatic valve to the pneumatically operable device; and a manually operable control means operable to release pressurized gas from the pneumatic valve into the connecting means;

said manually operable control means having a closed position covering the pneumatic valve and permitting the release of pressurized gas from the pneumatic valve into the connecting means and an open position not covering the pneumatic valve and permitting access to the pneumatic valve to refill the storage vessel by admitting gas through the pneumatic valve.

2. A pneumatic valve device for use with a pneumatically operable device and a storage vessel for pressurized gas at a pressure to operate the pneumatically operable device as claimed in claim 1 comprising:

said pneumatic valve has a tubular body open at each end and a stem biased to urge the pneumatic valve to a closed position and said manually operable control means is adapted to overcome said bias to release pressurized gas from said storage vessel.

3. A pneumatic valve device for use with a pneumatically operable device and a storage vessel for pressurized gas at a pressure to operate the pneumatically operable device as claimed in claim 1 in which said manually operated control means comprises a cupped member operable from an inoperative position to an operative position overlying the release opening of said pneumatic valve to seal the valve opening from the atmosphere and to communicate the release opening of said pneumatic valve to said connecting means for pneumatically connecting the pneuamtic valve with the pneumatically operable device in which, said manually operated control means comprises a button on the interior of said cupped member that engages with said pneumatic valve to overcome the normal bias thereof and release pressurized gas operate a pneumaticaly operable device in use.

4. A pneumatic valve device for use with a pneumatically operable device and a storage vessel for pressurized gas at a pressure to operate the pneumatically operable device as claimed in claim 1 in which a gas operated horn is pneumatically connected thereto.

5. A pneumatic valve device for use with a pneumatically operable device and a storage vessel for pressurized gas at a pressure to operate the pneumatically operable device as claimed in claim 1 in which a nozzle spray tube is pneumatically connected thereto.

6. A pneumatic horn device for use with a storage vessel for pressurized gas comprising:

a pneumatic horn;

a pneumatic valve pneumatically connectable to the storage vessel to admit and release pressurized gas into and from the storage vessel;

connecting moans pneumatically connecting said pneumatic valve to the pneumatic horn to operate the pneumatic horn;

a manually operable control means operable to release pressurized gas from the pneumatic valve into the connecting means; and said manually operable control means having a closed position covering the pneumatic valve and permitting the release of pressurized gas from the pneumatic valve into the connecting means and an open position not covering the pneumatic valve and permitting access to the pneumatic valve to refill the storage vessel by admitting gas through the pneumatic valve.

7. A pneumatic horn device for use with a storage vessel for pressurized gas as claimed in claim 6 wherein:

said pneumatic valve has a tubular body open at each end and a stem biased to urge the pneumatic valve to a closed position and said manually operable control means is adapted to overcome said bias to release pressurized gas from said storage vessel.

8. A pneumatic horn device for use with a storage vessel for pressurized gas as claimed in claim 7 in which:

said manually operated control means comprises a cupped member operable from an inoperative position overlying the release opening of said pneumatic valve to seal the pneumatic valve opening from the atmosphere and to communicate the release opening of said pneumatic valve to said connecting means for pneumatically connecting the pneumatic valve with the pneumatic horn and in which, said manually operated control means comprises a button on the interior of said cupped member that engages with said pneumatic valve to overcome the normal bias thereof and release pressurized gas to operate the pneumatic horn in use.

9. A pneumatic horn device for use with a storage vessel for pressurized gas as claimed in claim 7 in which:

said manually operated control means comprises a rigidly formed cupped member and a resilient elastomeric valve-mounting chamber, said rigidly formed cupped member being operable from an inoperative position to an operative position pressed against said resilient elastomeric valve-mounting chamber to overlie the release opening of said pneumatic valve to seal the pneumatic valve opening from the atmosphere and to communicate the release opening of said pneumatic valve to said connecting means for pneumatically connecting the pneumatic valve with the pneumatic horn and in which, said manual operated control means comprises a button on the interior of said cup that engages with said pneumatic valve to overcome the normal bias thereof and release pressurized gas to operate the pneumatic horn in use.

10. A pneumatic spray device device comprising:

a nozzle spray tube;

a storage vessel for pressurized gas at a pressure to provide pressurized gas for the nozzle spray tube;

a pneumatic valve pneumatically connected to the storage vessel to admit and release press gas into and from the storage vessel;

connecting means pneumatically connecting said pneumatic valve to the nozzle spray tube to conduct pressurized gas released through said pnuematic valve to the nozzle spray tube horn to cause pressurized gas to be emitted from the nozzle spray tube; and a manually operable control means operable to release pressurized gas from the pneumatic valve into the connecting means;

said manually operable control means having a closed position covering the pneumatic valve and permitting the release of pressurized gas from the pneumatic valve into the connecting means and an open position not covering the pneumatic valve and permitting access to the pneumatic valve to refill the storage vessel by admitting gas through the pneumatic valve.

11. A pneumatic spray device as claimed in claim 10 in which:

said pneumatic valve has a tubular body open at each end and a stem biased to urge the pneumatic valve to a closed position and said manually operable control means is adapted to overcome said bias to release pressurized gas from said storage vessel.

12. A pneumatic spray device as claimed in claim 11 in which:

said manually operated control means comprises a rigidly formed cupped member and a resilient elastomeric valve-mounting chamber, said rigidly formed cupped member being operable from an inoperative position to an operative position pressed against said resilient elastomeric valve-mounting chamber to overlie the release opening of said pneumatic valve to seal the pneumatic valve opening from the atmosphere and to communicate the release opening of said pneumatic valve to said connecting means for pneumatically connecting the pneumatic valve with the nozzle spray tube and in which, said manual operated control means comprises a button on the interior of said cup that engages with said pneumatic valve to overcome the normal bias thereof and release pressurized gas to permit emission of the pressurized gas from the nozzle spray tube in use.

13. A pneumatic spray device as claimed in claim 10 in which:

said manually operated control means comprises a cupped member operable from an inoperative position overlying the release opening of said pneumatic valve to seal the pneumatic valve opening from the atmosphere and to communicate the release opening of said pneumatic valve to said connecting means for pneumatically connecting the pneumatic valve with the nozzle spray tube and in which, said manually operated control means comprises a button on the interior of said cup that engages with said pneumatic valve to overcome the normal bias thereof and release pressurized gas to permit emission of the pressurized gas from the nozzle spray tube in use.

* * * * *